US012617427B2

(12) United States Patent (10) Patent No.: US 12,617,427 B2
Choi et al. (45) Date of Patent: May 5, 2026

(54) AUTONOMOUS DRIVING CONTROL APPARATUS AND METHOD FOR GENERATING DRIVING PATH THEREOF

(71) Applicants:Hyundai Motor Company, Seoul (KR); Kia Corporation, Seoul (KR)

(72) Inventors: Sung Woo Choi, Seoul (KR); Sung Kwan Kim, Incheon (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 63 days.

(21) Appl. No.: 18/626,133

(22) Filed: Apr. 3, 2024

(65) Prior Publication Data

US 2025/0026369 A1 Jan. 23, 2025

(30) Foreign Application Priority Data

Jul. 19, 2023 (KR) ........................ 10-2023-0094094

(51) Int. Cl.
B60W 60/00 (2020.01)
B60W 40/10 (2012.01)
(52) U.S. Cl.
CPC .......... B60W 60/001 (2020.02); B60W 40/10 (2013.01); B60W 2520/06 (2013.01)
(58) Field of Classification Search
CPC . B60W 60/001; B60W 40/10; B60W 2520/06
See application file for complete search history.

(56) References Cited

U.S. PATENT DOCUMENTS

| | | | | |
|---|---|---|---|---|
| 8,653,956 | B2 * | 2/2014 | Berkobin | ............... G08G 1/207 340/426.22 |
| 2005/0187705 | A1 | 8/2005 | Niwa et al. | |
| 2018/0284769 | A1 | 10/2018 | Wang et al. | |
| 2019/0113351 | A1 * | 4/2019 | Antony | ........... B60W 30/18145 |
| 2020/0314623 | A1 * | 10/2020 | Pellegrini | ............... H04W 4/02 |
| 2021/0123750 | A1 | 4/2021 | Im et al. | |
| 2021/0221355 | A1 * | 7/2021 | Kang | ................... B62D 15/025 |
| 2021/0373566 | A1 * | 12/2021 | Agarwal | ......... B60W 30/18145 |
| 2021/0394745 | A1 * | 12/2021 | Mujumdar | ......... B60W 60/0011 |
| 2024/0059285 | A1 * | 2/2024 | Ng | ........................ B60W 50/14 |

FOREIGN PATENT DOCUMENTS

| KR | 10-2013-0057893 A | 6/2013 |
|---|---|---|
| KR | 10-1465649 B | 11/2014 |
| KR | 10-2344511 B | 12/2021 |
| KR | 10-2022-0071988 A | 6/2022 |

* cited by examiner

*Primary Examiner* — Gertrude Arthur Jeanglaude
(74) *Attorney, Agent, or Firm* — MORGAN, LEWIS & BOCKIUS LLP

(57) ABSTRACT

An autonomous driving control apparatus and a method for generating a driving path thereof are provided. The autonomous driving control apparatus includes a processor that receives a driving path from a navigation device. The processor is configured to determine whether there is a turn section on the driving path, determines a turn path, a curvature of which continuously changes in response to determining that there is the turn section on the driving path, and outputs the turn path.

18 Claims, 10 Drawing Sheets

AUTONOMOUS DRIVING CONTROL APPARATUS AND METHOD FOR GENERATING DRIVING PATH THEREOF

CROSS-REFERENCE TO RELATED APPLICATION

The present application claims priority to Korean Patent Application No. 10-2023-0094094, filed on Jul. 19, 2023, the entire contents of which is incorporated herein for all purposes by this reference.

BACKGROUND OF THE PRESENT DISCLOSURE

Field of the Present Disclosure

The present disclosure relates to an autonomous driving control apparatus and a method for generating a driving path thereof.

DESCRIPTION OF RELATED ART

When a path with a discontinuous curvature is generated when a driving path of a vehicle is generated, there is an inconvenience of having to adjust a steering angle of the vehicle to suit the discontinuous curvature after the vehicle stops. However, when following a continuous curvature path, the vehicle may follow a path, a curvature of which changes, without stopping.

A conventional method for generating a continuous curvature path configures the continuous curvature path using a clothoid for increasing curvature, a circle for maintaining the increased curvature and changing a heading, and a clothoid for decreasing the curvature to "0" again.

However, when a path ends at the end portion of the clothoid, where the end point will occur may be determined only after all the calculations are finished, it is difficult to place the end point at a position desired by a user.

It is essential to use two continuous curvature turn path, each of which includes two clothoids and one circle, and a segment element connecting the respective continuous curvature turn paths. One turn path is configured with respect to a start point and one turn path is configured with respect to an end point, and end clothoid portions of the two turn paths are connected by a straight line.

However, in the instant case, the path becomes very long. It is impossible to use the path in a narrow section such as a U-turn section.

The information included in this Background in this Background of the present disclosure is only for enhancement of understanding of the general background of the present disclosure and may not be taken as an acknowledgement or any form of suggestion that this information forms the prior art already known to a person skilled in the art.

BRIEF SUMMARY

Various aspects of the present disclosure are directed to providing an autonomous driving control apparatus and a method for generating a driving path thereof to generate a continuous curvature path for a narrow turn section, such as a U-turn section, when generating the driving path of the vehicle.

The technical problems to be solved by the present disclosure are not limited to the aforementioned problems, and any other technical problems not mentioned herein will be clearly understood from the following description by those skilled in the art to which the present disclosure pertains.

According to an aspect of the present disclosure, an autonomous driving control apparatus may include a processor that receives a driving path from a navigation device. The processor is configured to determine whether there is a turn section on the driving path, may be configured to determine a turn path, a curvature of which continuously changes in response to determining that there is the turn section on the driving path, and may outputs the turn path.

The processor is configured to determine a start point and an end point of the turn section and a target vehicle heading deflection based on the driving path.

The processor may estimate a maximum curvature and a maximum steering angular speed based on the end point of the turn section and the target vehicle heading deflection.

The processor may estimate the maximum curvature and the maximum steering angular speed using a deep neural network (DNN).

The processor is configured to determine an end point of a first clothoid curve and a vehicle heading and a curvature at the end point of the first clothoid curve based on the maximum curvature and the maximum steering angular speed.

The processor is configured to determine a clothoid length based on the maximum curvature and the maximum steering angular speed.

The processor is configured to determine a vehicle heading deflection in a clothoid section based on the maximum curvature and the maximum steering angular speed.

The processor is configured to determine a rotational center point based on the end point of the first clothoid curve, the vehicle heading at the end point of the first clothoid curve, and the maximum curvature and may be configured to determine a circle curve based on the end point of the first clothoid curve, the target vehicle heading deflection, the vehicle heading deflection in the clothoid section, and the rotational center point.

The processor is configured to determine a second clothoid curve based on the target vehicle heading deflection and the rotational center point.

The processor is configured to determine the turn path using the first clothoid curve, the circle curve, and the second clothoid curve.

According to another aspect of the present disclosure, a method for generating a driving path of an autonomous driving control apparatus may include receiving a driving path from a navigation device, determining whether there is a turn section on the driving path, determining a turn path, a curvature of which continuously changes in response to determining that there is the turn section on the driving path, and outputting the turn path.

The determining of the turn path may include determining a start point and an end point of the turn section and a target vehicle heading deflection based on the driving path.

The determining of the turn path may further include estimating a maximum curvature and a maximum steering angular speed based on the end point of the turn section and the target vehicle heading deflection.

The estimating of the maximum curvature and the maximum steering angular speed may include estimating the maximum curvature and the maximum steering angular speed using a deep neural network (DNN).

The determining of the turn path may further include determining an end point of a first clothoid curve and a vehicle heading and a curvature at the end point of the first clothoid curve based on the maximum curvature and the maximum steering angular speed.

The determining of the turn path may further include determining a clothoid length based on the maximum curvature and the maximum steering angular speed.

The determining of the turn path may further include determining a vehicle heading deflection in a clothoid section based on the maximum curvature and the maximum steering angular speed.

The determining of the turn path may further include determining a rotational center point based on the end point of the first clothoid curve, the vehicle heading at the end point of the first clothoid curve, and the maximum curvature and determining a circle curve based on the end point of the first clothoid curve, the target vehicle heading deflection, the vehicle heading deflection in the clothoid section, and the rotational center point.

The determining of the turn path may further include determining a second clothoid curve based on the target vehicle heading deflection and the rotational center point.

The determining of the turn path may further include determining the turn path using the first clothoid curve, the circle curve, and the second clothoid curve.

The methods and apparatuses of the present disclosure have other features and advantages which will be apparent from or are set forth in more detail in the accompanying drawings, which are incorporated herein, and the following Detailed Description, which together serve to explain certain principles of the present disclosure.

Figure 1:
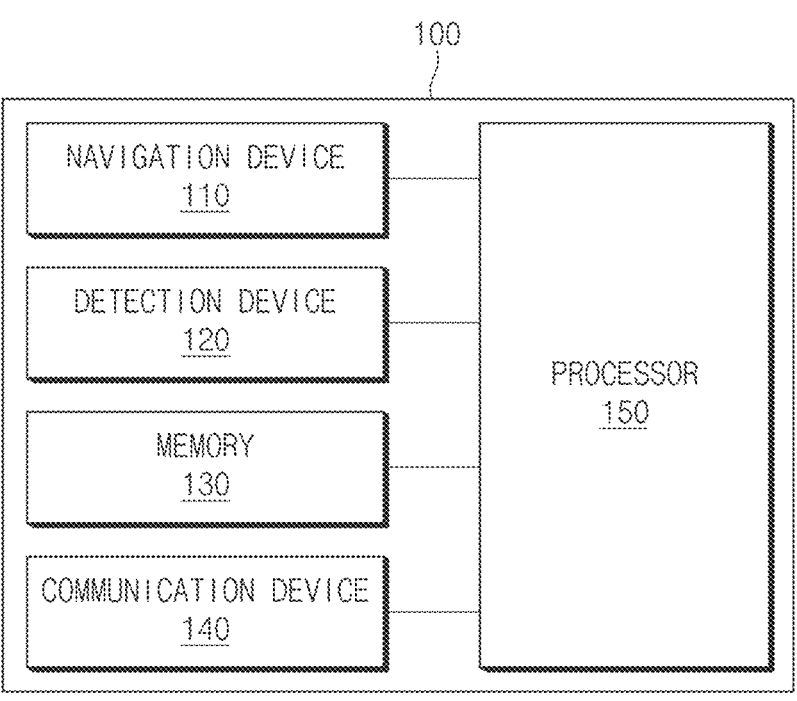
FIG. 1 is a block diagram illustrating a configuration an autonomous driving control apparatus according to various exemplary embodiments of the present disclosure.

It may be understood that the appended drawings are not necessarily to scale, presenting a somewhat simplified representation of various features illustrative of the basic principles of the present disclosure. The predetermined design features of the present disclosure as included herein, including, for example, specific dimensions, orientations, locations, and shapes will be determined in part by the particularly intended application and use environment.

In the figures, reference numbers refer to the same or equivalent portions of the present disclosure throughout the several figures of the drawing.

DETAILED DESCRIPTION

Reference will now be made in detail to various embodiments of the present disclosure(s), examples of which are illustrated in the accompanying drawings and described below. While the present disclosure(s) will be described in conjunction with exemplary embodiments of the present disclosure, it will be understood that the present description is not intended to limit the present disclosure(s) to those exemplary embodiments of the present disclosure. On the other hand, the present disclosure(s) is/are intended to cover not only the exemplary embodiments of the present disclosure, but also various alternatives, modifications, equivalents and other embodiments, which may be included within the spirit and scope of the present disclosure as defined by the appended claims.

Hereinafter, various exemplary embodiments of the present disclosure will be described in detail with reference to the exemplary drawings. In the drawings, the same reference numerals will be used throughout to designate the same or equivalent elements. Furthermore, a detailed description of well-known features or functions will be ruled out in order not to unnecessarily obscure the gist of the present disclosure.

In describing the components of the exemplary embodiment of the present disclosure, terms such as first, second, "A", "B", (a), (b), and the like may be used. These terms are only used to distinguish one element from another element, but do not limit the corresponding elements irrespective of the order or priority of the corresponding elements. Furthermore, unless otherwise defined, all terms including technical and scientific terms used herein are to be interpreted as is customary in the art to which the present disclosure belongs. It will be understood that terms used herein should be interpreted as having a meaning which is consistent with their meaning in the context of the present disclosure and the relevant art and will not be interpreted in an idealized or overly formal sense unless expressly so defined herein.

Figure 2:
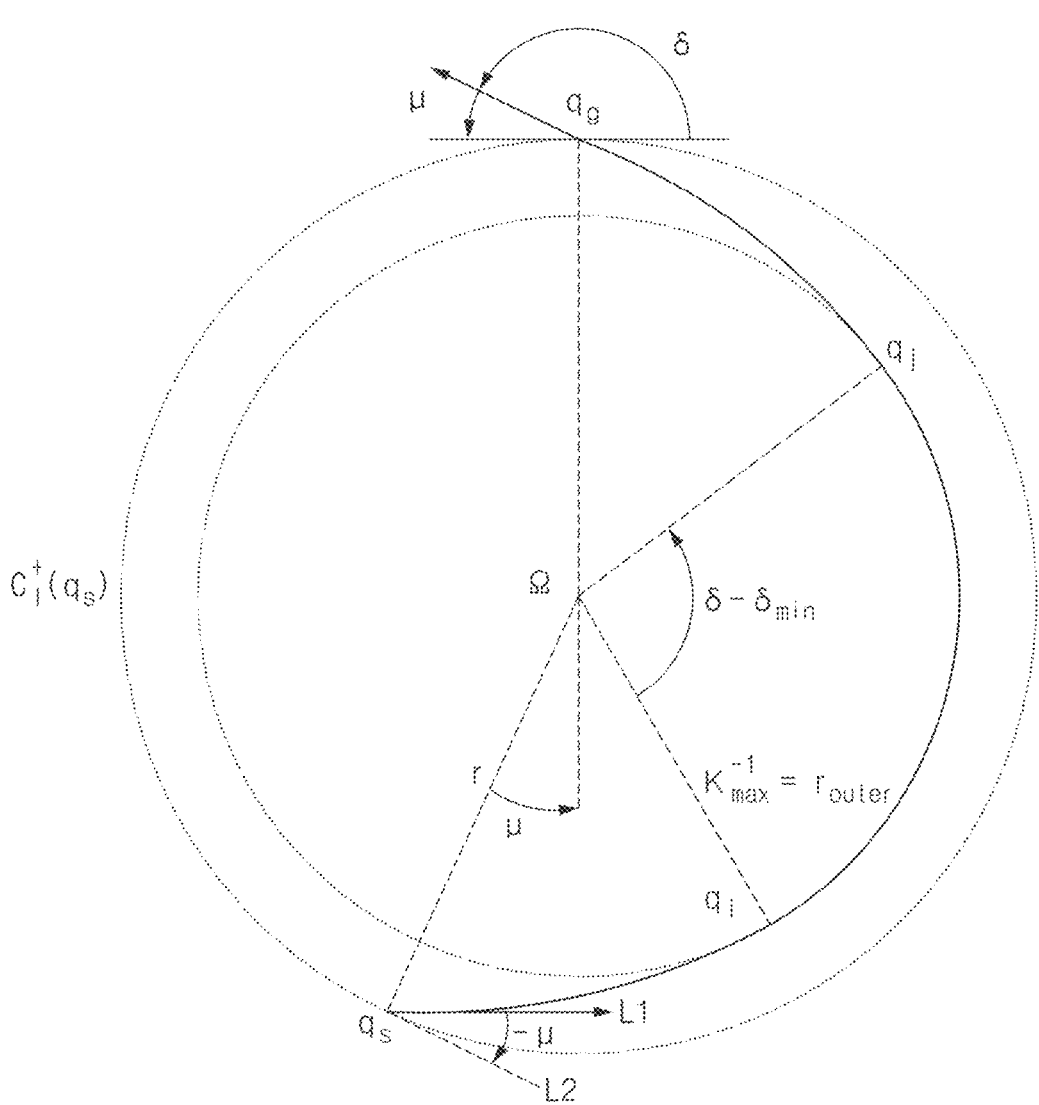
FIG. 2 is a drawing for describing a process of generating a driving path according to various exemplary embodiments of the present disclosure.

FIG. 1 is a block diagram illustrating a configuration of an autonomous driving control apparatus according to various exemplary embodiments of the present disclosure. FIG. 2 is a drawing for describing a process of generating a driving path according to various exemplary embodiments of the present disclosure.

Referring to FIG. 1, an autonomous driving control apparatus 100 may include a navigation device 110, a detection device 120, a memory 130, a communication device 140, and/or a processor 150.

When a destination is set, the navigation device 110 may navigate a driving path from a starting point (e.g., a current position of the vehicle) to the destination and may guide a vehicle along the navigated driving path. The navigation device 110 may reflect real-time traffic information when navigating a driving path to search for an optimal path (e.g., the shortest distance, a minimum time, and/or the like). Although not illustrated in the drawing, the navigation device 110 may include a memory for storing map data, a global positioning system (GPS) receiver configured for measuring a position of the vehicle, a communication module for receiving traffic information from the outside thereof, a processor for navigating a driving path and guiding the vehicle along the navigated driving path, and/or the like.

The detection device 120 may obtain driving information (e.g., a steering angle, a vehicle speed, or the like) using sensors (e.g., a steering angle sensor, a vehicle speed sensor, an inertial measurement unit (IMU), an image sensor, and/or the like) mounted on the vehicle.

The memory 130 may store specification information and/or predetermined information of the vehicle. The memory 130 may include turn end point determination logic, a continuous curvature path generation algorithm, a deep learning algorithm, and/or the like.

The memory 130 may be a non-transitory storage medium which stores instructions executed by the processor 150. The memory 130 may be implemented as at least one of storage media (or recording media) such as a flash memory, a hard disk, a solid state disk (SSD), a random access memory (RAM), a static RAM (SRAM), a read only memory (ROM), a programmable ROM (PROM), an electrically erasable and programmable ROM (EEPROM), or an erasable and programmable ROM (EPROM).

The communication device 140 may support to establish a wired or wireless communication connection between the autonomous driving control apparatus 100 and an external electronic device (e.g., an electronic control unit (ECU) or the like) and perform communication through the established connection. The communication device 140 may include a communication processor, a communication circuit, an antenna, a transceiver, and/or the like. In an exemplary embodiment of the present disclosure, the wireless communication includes a technology using radio waves.

The processor 150 may be operatively connected to the navigation device 110, the detection device 120, the memory 130, and/or the communication device 140 through a bus. The processor 150 may interwork with the navigation device 110, the detection device 120, the memory 130, and/or the communication device 140 to control the overall operation of the autonomous driving control apparatus 100. The processor 150 may be implemented as at least one of processing devices such as an application specific integrated circuit (ASIC), a digital signal processor (DSP), a programmable logic device (PLD), a field programmable gate array (FPGA), a central processing unit (CPU), a microcontroller, or a microprocessor.

The processor 150 may receive the driving path from the navigation device 110. The processor 150 may identify whether there is a turn section (e.g., a U-turn section) in front of the vehicle based on the received driving path. The processor 150 may identify whether there is a turn section within a predetermined distance (e.g., 20 m) in front of the vehicle on the driving path.

When it is identified that there is the turn section, the processor 150 may be configured to generate a turn path for the turn section. The processor 150 may be configured to generate a turn path including two clothoid curves (or a clothoid path) and one circle curve (or a circle path). The turn path may be a path, a curvature of which continuously changes, that is, a continuous curvature path.

The processor 150 may output the generated turn path to the navigation device 110 and/or a vehicle controller. The navigation device 110 may display the turn path on its display screen so that a driver drives the vehicle along the turn path. The vehicle controller may be configured for controlling a behavior (e.g., steering, braking, acceleration, deceleration, and/or the like) of the vehicle so that the vehicle follows the turn path.

Hereinafter, a description will be given of a process of generating the turn path.

The processor 150 may identify a start point $q_s$ and an end point (or a target point) $q_g$ of the turn section based on the driving path received from the navigation device 110. The processor 150 may be configured to determine the end point $q_g$ of the turn section using the turn end point determination logic. The end point $q_g$ of the turn section may be center coordinates of a lane to turn and converge.

The processor 150 may estimate a maximum curvature $k_{max}$ and a maximum steering angular speed $\sigma_{max}$ based on the end point $q_g$ of the turn section and a target vehicle heading deflection $\delta$. At the instant time, the processor 150 may estimate the maximum curvature $k_{max}$ and the maximum steering angular speed $\sigma_{max}$ using a deep neural network (DNN). $k_{max}$ is the reciprocal of the body turn radius when adjusting the steering wheel of the vehicle to the maximum steering angle, and $\sigma_{max}$ is the steering angular speed obtained by differentiating the steering angle. The target vehicle heading deflection $\delta$ is the heading of the vehicle, which is desired when reaching the target point (or end point) of the turn section, which may be a difference between a vehicle heading at the start point of the turn section and a vehicle heading at the end point of the turn section.

The processor 150 may be configured to determine a heading $\delta_{min}$ of the vehicle, which is configured to change using the clothoid section, (i.e., a vehicle heading deflection in the clothoid section) and a clothoid length s, based on the maximum curvature $k_{max}$ and the maximum steering angular speed $\sigma_{max} \cdot \delta_{min}$ may be represented as Equation 1 below, and s may be represented as Equation 2 below.

$$\delta_{min} = \frac{k_{max}^2}{\sigma_{max}} \qquad \text{[Equation 1]}$$

$$s = \frac{k_{max}}{\sigma_{max}} \qquad \text{[Equation 2]}$$

The processor 150 may be configured to determine a first clothoid curve based on the maximum curvature $k_{max}$ and the maximum steering angular speed $\sigma_{max}$. The processor 150 may be configured to determine the first clothoid curve in which the start point $q_s$ of the turn section is a start point of the first clothoid curve using Equation 3 below.

$$\text{[Equation 3]}$$

$$q_i = \begin{cases} x_i = \sqrt{\dfrac{\pi}{\sigma_{max}}} C_f\left(\sqrt{\dfrac{k_{max}^2}{\pi\sigma_{max}}}\right) \\[2mm] y_1 = \sqrt{\dfrac{\pi}{\sigma_{max}}} S_f\left(\sqrt{\dfrac{k_{max}^2}{\pi\sigma_{max}}}\right) & \text{where } \dfrac{k_{max}^2}{\pi\sigma_{max}} = \dfrac{\sigma_{max}s^2}{\pi} = \dfrac{\delta_{min}}{\pi} \\[2mm] \theta_i = \dfrac{k_{max}^2}{2\sigma_{max}} \\[2mm] k_i = k_{max} \end{cases}$$

Herein, $q_i$ denotes the end point $(x_i, y_i)$ of the first clothoid, $\theta_i$ denotes the vehicle heading at the end point of the first clothoid, $k_i$ denotes the curvature at the end point of the first clothoid, and $C_f(x)$ and $S_f(x)$ denote Fresnel integral values. $C_f(x)$ and $S_f(x)$ may be represented as Equation 4 below and Equation 5 below, respectively.

$$C_f(x) = \int_0^x \cos\frac{\pi}{2}u^2\,du \qquad \text{[Equation 4]}$$

$$S_f(x) = \int_0^x \sin\frac{\pi}{2}u^2\,du \qquad \text{[Equation 5]}$$

Herein, u denotes the predetermined temporal variable.

Points formed from the start point of the first clothoid curve, that is, the start point $q_s$ of the turn section, to the end point $q_i$ of the first clothoid curve may have a randomly set interval. The curvature k of the parameter $$\frac{k^2}{\pi\sigma_{max}}$$

for determining a Fresnel integral interval may increase from "0" from $k_{max}$.

The processor 150 may be configured to determine a rotational center point $\Omega$ of a circle curve based on the end point $q_i$ of the first clothoid curve and the maximum curvature $k_{max}$. The rotational center point of the circle curve may be represented as Equation 6 below.

$$\Omega = \begin{cases} x_\Omega = x_i - k_{max}^{-1}\sin(\theta_i) \\ y_\Omega = y_i - k_{max}^{-1}\sin(\theta_i) \end{cases} \qquad \text{[Equation 6]}$$

The processor 150 may be configured to determine a radius r of the circle curve using the rotational center point $\Omega$. The radius r of the circle curve may be represented as Equation 7 below.

$$r_{outer} = \sqrt{x_\Omega^2 + y_\Omega^2} \qquad \text{[Equation 7]}$$

The processor 150 may be configured to determine an end point $q_j$ of the circle curve. The processor 150 may be configured to determine the end point $q_j$ of the circle curve and a vehicle heading $\theta_j$ and a curvature $k_j$ at the end point $q_j$ using the Equation 8 below.

$$q_j = \begin{cases} x_j = x_i\cos(\delta - \delta_{min}) - y_i\sin(\delta - \delta_{min}) + x_\Omega \\ y_j = x_i\sin(\delta - \delta_{min}) + y_i\cos(\delta - \delta_{min}) + y_\Omega \\ \theta_j = \theta_i + \delta - \delta_{min} \\ k_j = k_{max} \end{cases} \qquad \text{[Equation 8]}$$

The processor 150 may be configured to determine a second clothoid curve configured from the end point $q_j$ of the circle curve to the target point $q_g$ of the turn section. At the instant time, the processor 150 may be configured to determine an end point of the second clothoid curve, that is, the target point $q_g$ of the turn section, and a vehicle heading $\theta_j$ and a curvature $k_g$ at the end point using the Equation 9 below.

$$q_g = \begin{cases} x_g = -x_\Omega\cos(\delta - 2\mu) + y_\Omega\sin(\delta - 2\mu) + x_\Omega \\ y_g = -x_\Omega\sin(\delta - 2\mu) - y_i\cos(\delta - 2\mu) + y_\Omega \\ \theta_g = \delta \\ k_g = 0 \end{cases} \qquad \text{[Equation 9]}$$

Herein, $\mu$ denotes the angle formed by the vehicle heading L1 at the point on the circle $$C_i^+(q_s)$$

with the radius r with respect to the rotational center point $\Omega$ (i.e., the distance between the rotational center point $\Omega$ and the start point $q_s$ of the turn section) that is, the start point $q_s$ of the turn section, and the tangent L2 at the start point $q_s$ of the turn section, and $\mu = \arctan(x_\Omega/y_\Omega)$.

The processor 150 may be configured to generate a turn path including the first clothoid curve, the circle curve, and the second clothoid curve. In other words, the processor 150 may connect the end point of the first clothoid curve with the start point of the circle curve and may connect the end point of the circle curve with the start point of the second clothoid curve to generate a continuous curvature path.

Figure 3:
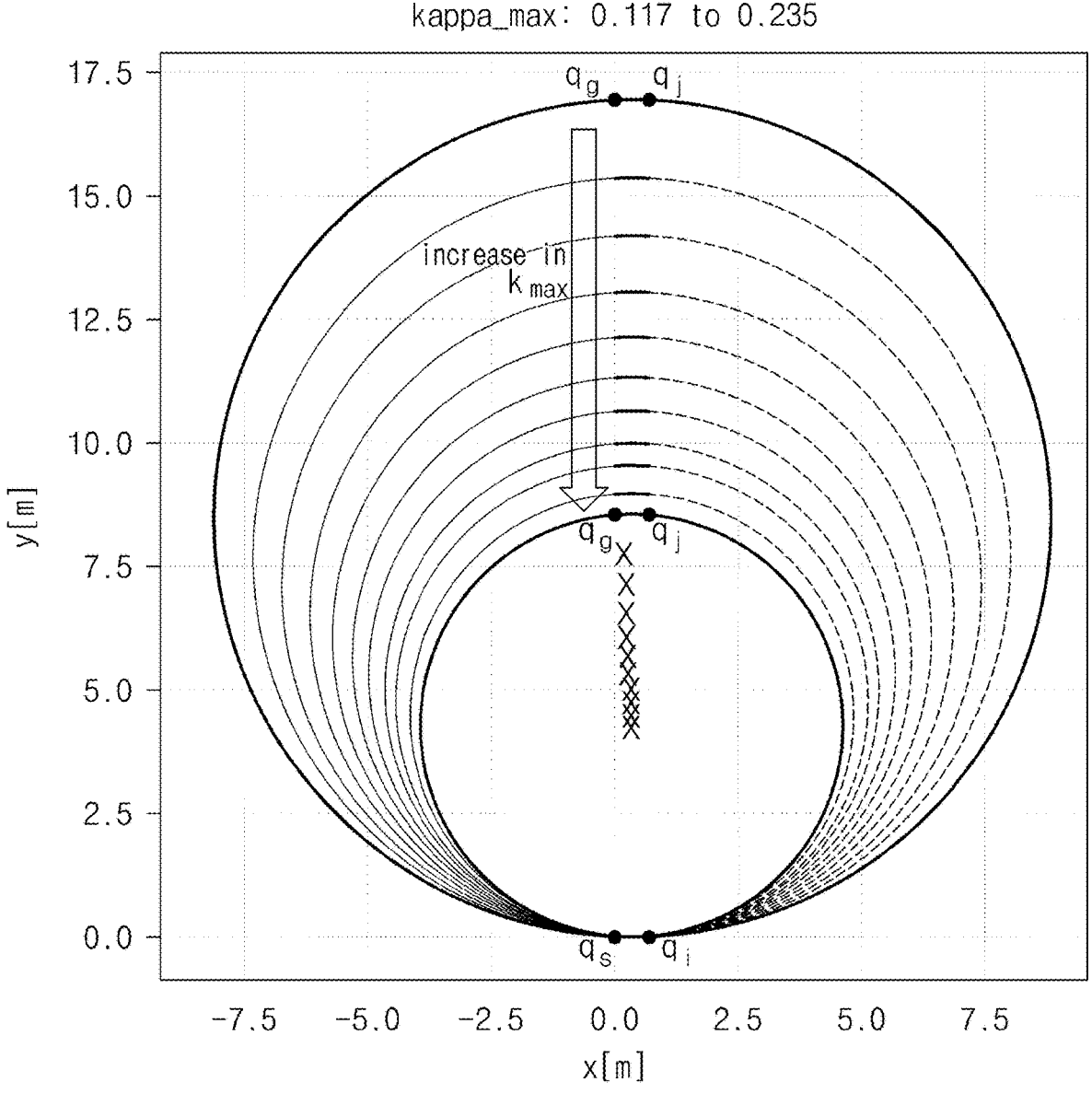
FIG. 3 is a graph illustrating a change in turn path according to a change in curvature associated with the present disclosure.
Figure 4:
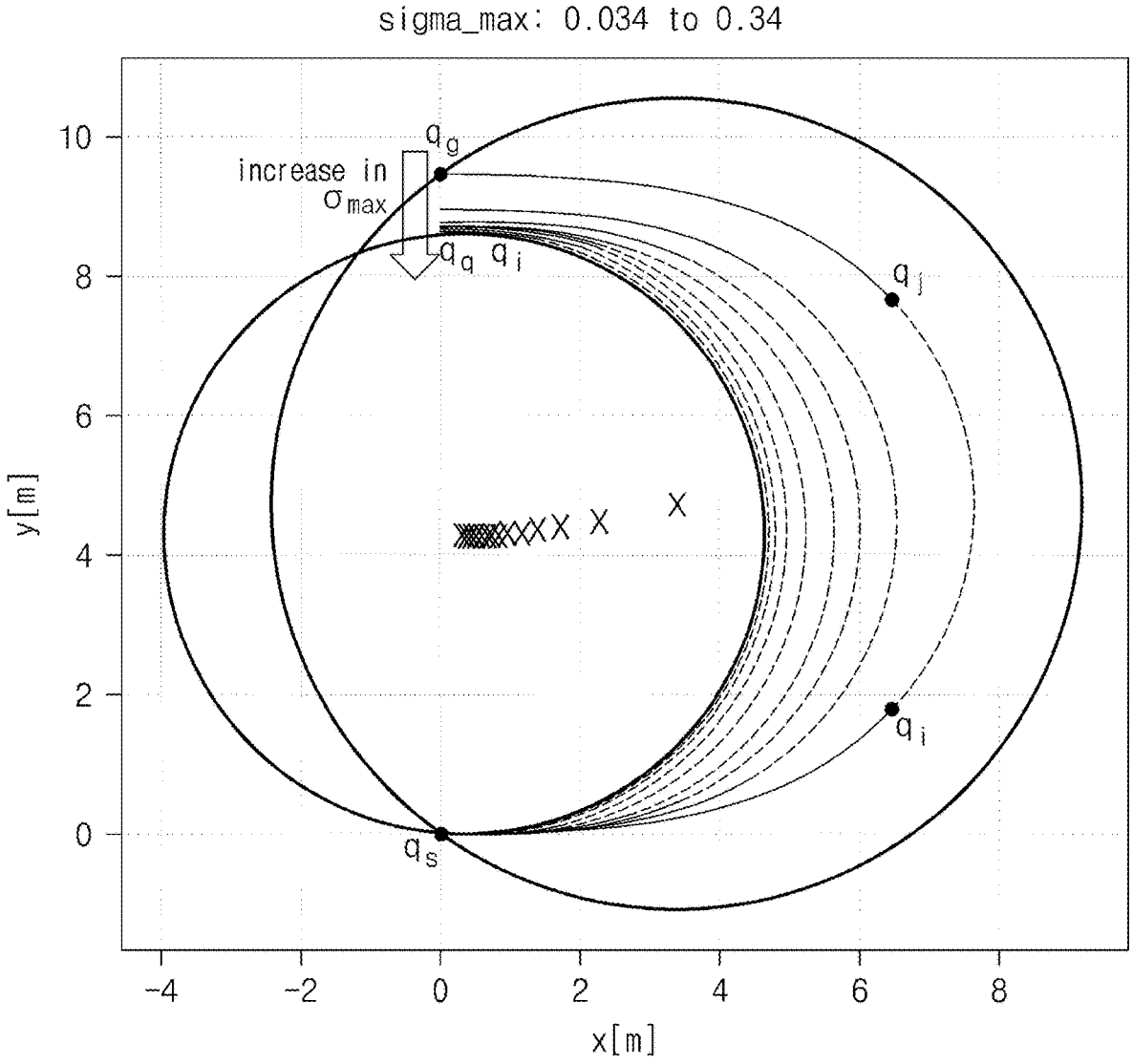
FIG. 4 is a graph illustrating a change in turn path according to a change in steering angular speed associated with the present disclosure.

FIG. 3 is a graph illustrating a change in turn path according to a change in curvature associated with the present disclosure. FIG. 4 is a graph illustrating a change in turn path according to a change in steering angular speed associated with the present disclosure.

Referring to FIG. 3, it may be seen that as a maximum curvature $k_{max}$ increases, a turn radius of the turn path decreases. Referring to FIG. 4, it may be seen that as a maximum steering angular speed $\sigma_{max}$ increases, a turn radius of the turn path decreases. Accordingly, because the maximum curvature $k_{max}$ and the maximum steering angular speed $\sigma_{max}$ affect the turn radius of the turn path, they may be selected as variables necessary to determine an end point of the turn path.

To determine the end point $q_g$ of the turn path, a range a continuous curvature path may have depending on constraints (e.g., a steering angular speed, a maximum steering angle, and the like) of a vehicle may be determined, and curvatures $\kappa$, $\sigma$, and $\delta$ to reach a specific end point (x, y) may be collected to make Table 1 below. However, when Table 1 is used, the following problems may occur.

1) Because of searching for $\kappa$, $\sigma$ using x, y, $\delta$, as calculation corresponding to the multiplication of the number of respective parameters is performed, an unnecessary computing resource is wasted.

2) As a space empty as x, y, $\delta$ are discontinuously arranged, that is, a space which fails in search occurs, it is impossible to generate a continuous curvature path.

TABLE 1

| x, y, $\delta$ | k, $\sigma$ |
|---|---|
| $x_1$, $y_1$, $\delta_1$ | $k_1$, $\sigma_1$ |
| $x_2$, $y_2$, $\delta_2$ | $k_2$, $\sigma_2$ |
| . . . | . . . |

To address a problem when the continuous curvature path is generated using Table 1 above, a deep neural network (DNN) is configured to generate a function capable of approximating Table 1.

Figure 5:
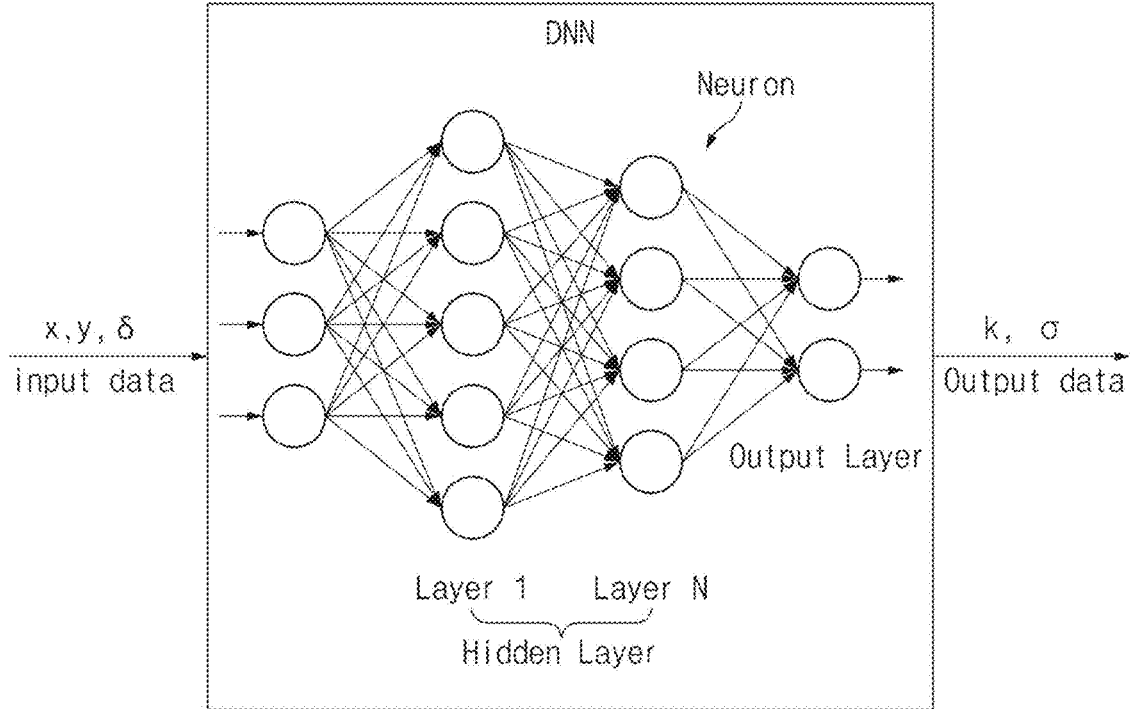
FIG. 5 illustrates a deep neural network (DNN) structure according to various exemplary embodiments of the present disclosure.
Figure 6:
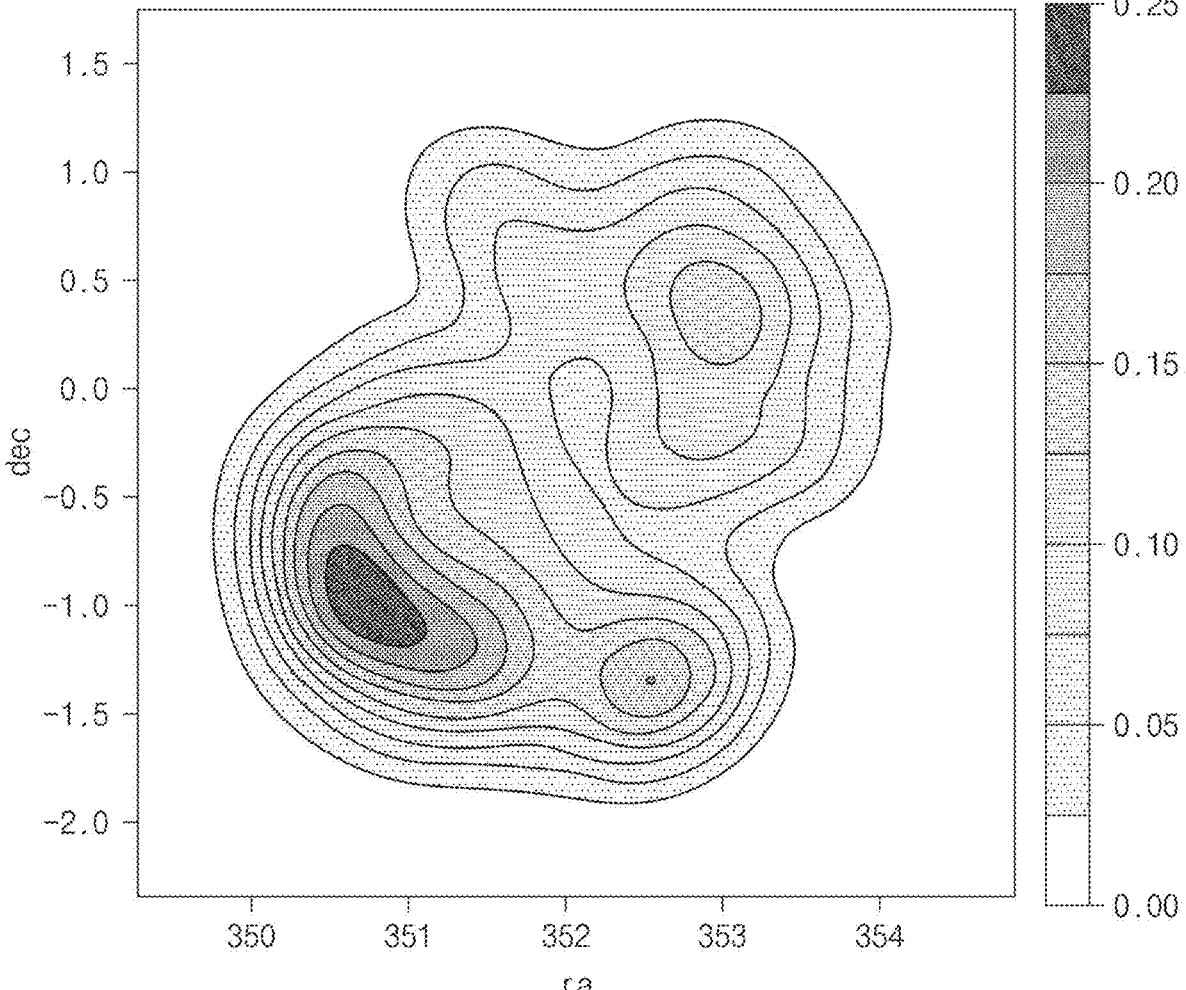
FIG. 6 is a drawing illustrating an example of a density contour according to various exemplary embodiments of the present disclosure.

FIG. 5 illustrates a DNN structure according to various exemplary embodiments of the present disclosure. FIG. 6 is a drawing illustrating an example of a density contour according to various exemplary embodiments of the present disclosure.

A DNN may receive an end point (x, y) of a turn path and a target vehicle heading deflection $\delta$ as input data and may output a maximum curvature $k_{max}$ and a maximum steering angular speed $\sigma_{max}$ as output data. Hidden layers of the DNN may be 64*3, which may change to suit a situation. An activation function of each layer may use an activation function used to address a regression problem, for example, a sigmoid function, a hyperbolic tangent (tanh) function, an exponential linear unit (ELU) function, and/or a rectified linear unit (ReLU) function.

When a phenomenon in which points are concentrated near a start point of a turn path appears as shown in FIG. 3, a density contour may be configured as shown in FIG. 6 to evenly distribute points in the concentrated area.

Figure 7:
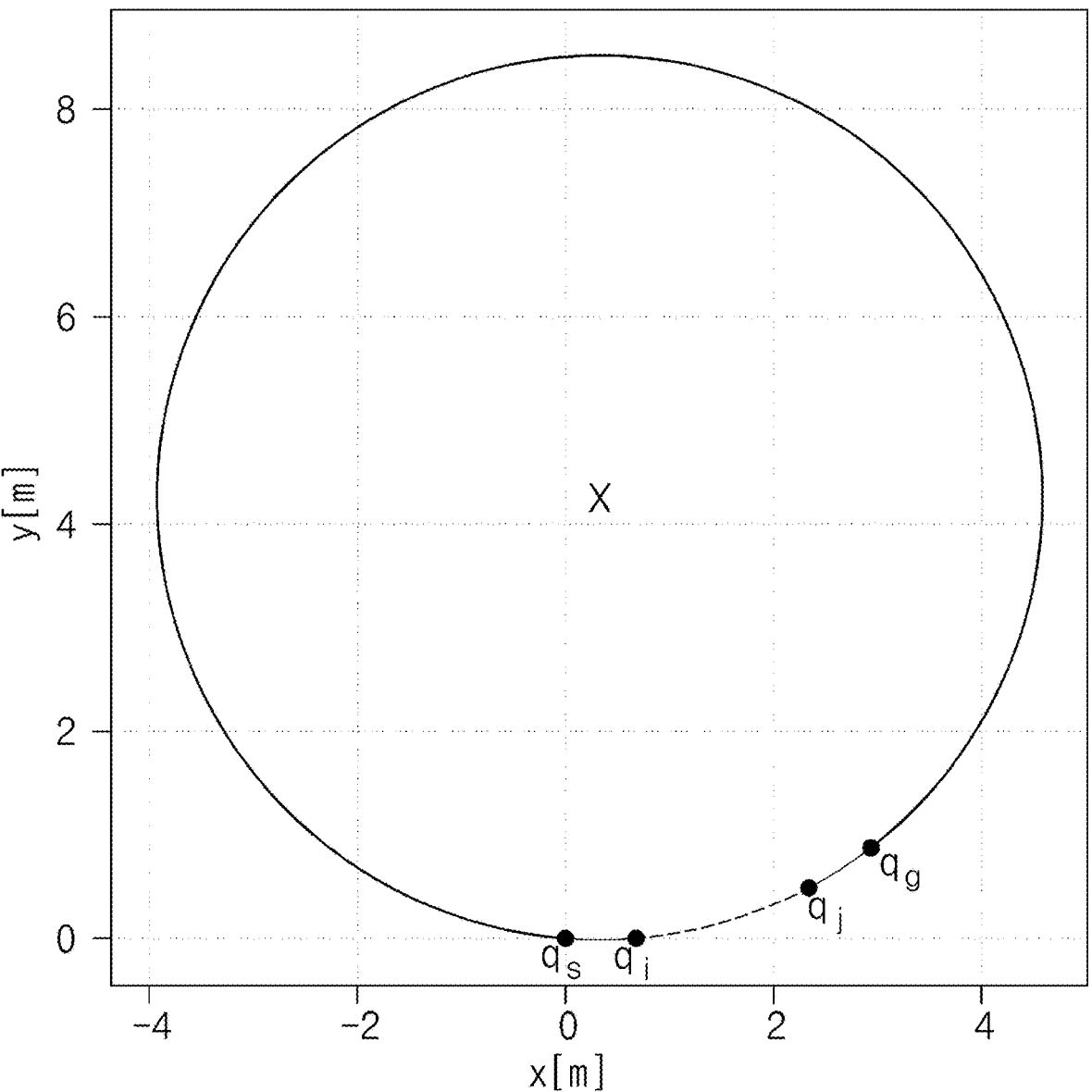
FIG. 7 is a drawing illustrating an example of estimating a parameter using a DNN according to various exemplary embodiments of the present disclosure.

FIG. 7 is a drawing illustrating an example of estimating a parameter using a DNN according to various exemplary embodiments of the present disclosure.

A processor 150 may input a target vehicle heading deflection $\delta$ and an end point (x, y) of a turn path to the DNN. For example, the processor 150 may input $\delta$ (=33 [deg]), x (=2.956708 [m]), and y (=0.875817 [m]) to the DNN and may estimate a maximum curvature $k_{max}$ and a maximum steering angular speed $\emptyset_{max.}$ Thereafter, the processor 150 may be configured to generate a continuous curvature path (i.e., a turn path) using the maximum curvature $k_{max}$ and the maximum steering angular speed $\sigma_{max}$, which are estimated.

Figure 8:
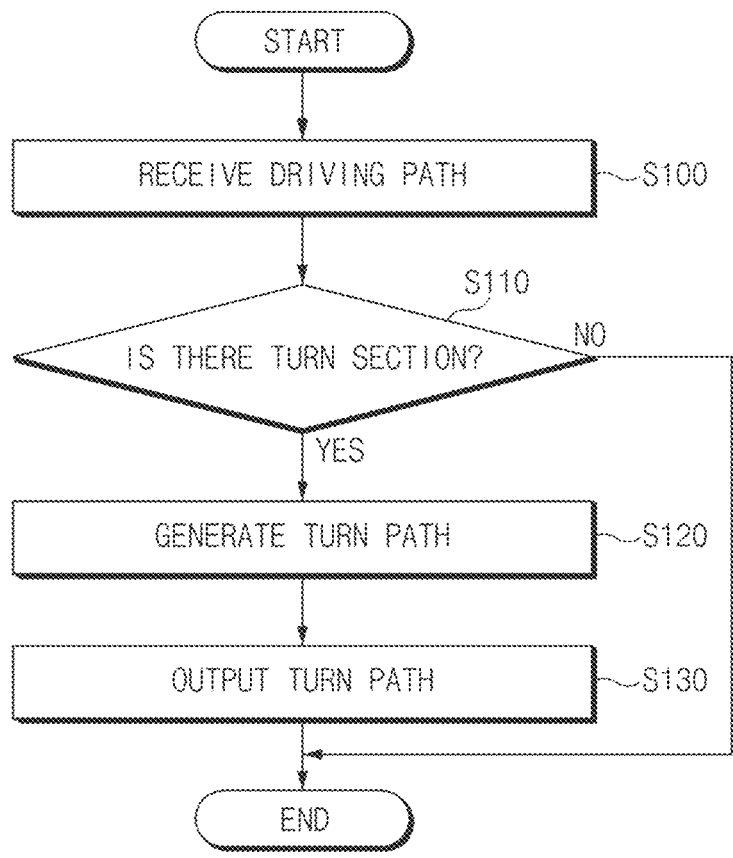
FIG. 8 is a flowchart illustrating a method for generating a driving path of an autonomous driving control apparatus according to various exemplary embodiments of the present disclosure.

FIG. 8 is a flowchart illustrating a method for generating a driving path of an autonomous driving control apparatus according to various exemplary embodiments of the present disclosure.

In S100, a processor 150 may receive a driving path from a navigation device 110. The navigation device 110 may navigate a driving path from a starting point of the vehicle to a destination of the vehicle and may transmit the navigated driving path to the processor 150. The processor 150 may be configured to generate a local path based on the driving path received from the navigation device 110, that is, a global path.

In S110, the processor 150 may be configured to determine whether there is a turn section based on the driving path. The processor 150 may identify whether there is a turn section in front of the vehicle based on the received driving path. The processor 150 may identify whether there is a turn section within a predetermined distance in front of the vehicle on the driving path (or the local path).

When it is determined that there is the turn section on the driving path, in S120, the processor 150 may be configured to generate a turn path. The processor 150 may be configured to generate a turn path including two clothoid curves and one circle curve. The turn path may be a continuous curvature path, a curvature of which continuously changes.

In S130, the processor 150 may output the generated turn path. The processor 150 may output the generated turn path to the navigation device 110 and/or a vehicle controller. The navigation device 110 may display the turn path on its display screen, and a driver of the vehicle may control a steering wheel of the vehicle so that the vehicle travels along the turn path. The vehicle controller may be configured for controlling a behavior of the vehicle (e.g., steering, braking, acceleration, deceleration, and/or the like) so that the vehicle (e.g., an autonomous vehicle) follows the turn path.

Figure 9:
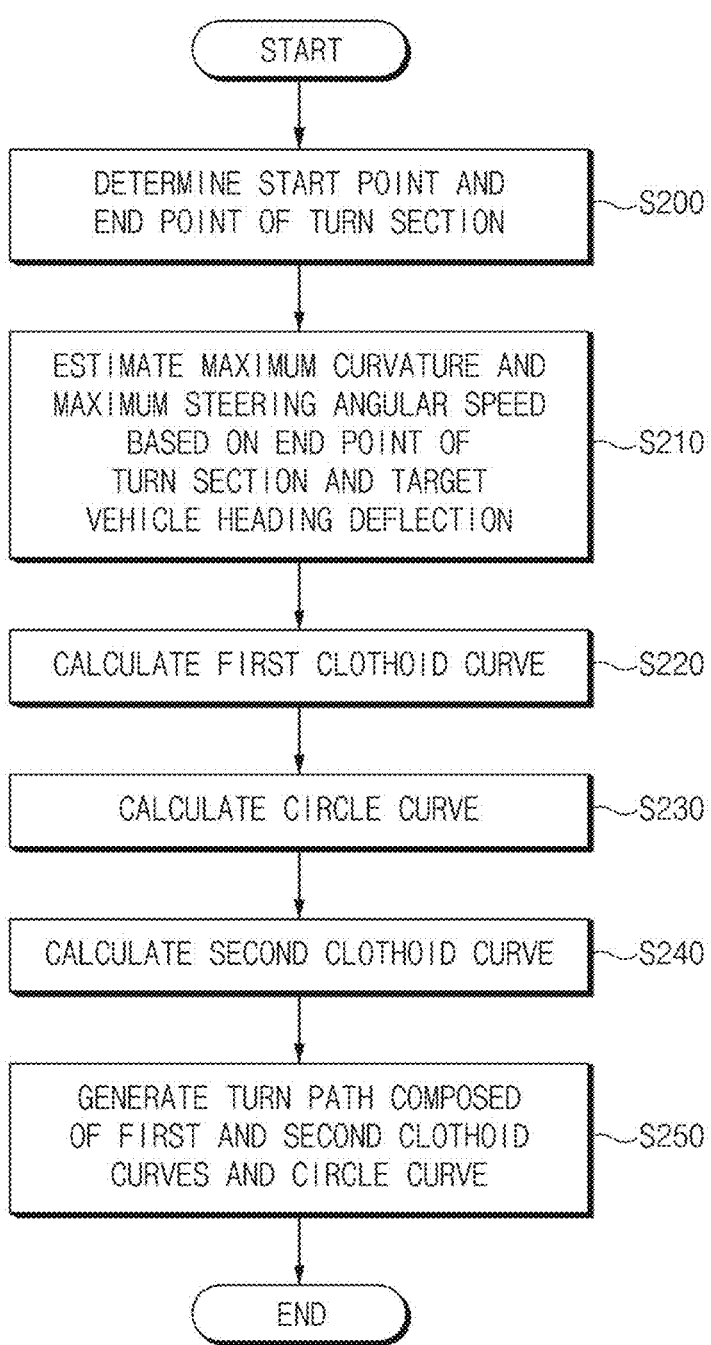
FIG. 9 is a flowchart illustrating a method for generating a turn path according to various exemplary embodiments of the present disclosure.

FIG. 9 is a flowchart illustrating a method for generating a turn path according to various exemplary embodiments of the present disclosure.

In S200, a processor 150 may be configured to determine a start point and an end point of a turn section identified on a driving path. The processor 150 may be configured to determine the end point of the turn section using turn end point determination logic. Furthermore, the processor 150 may be configured to determine a difference between a vehicle heading at the start point of the turn section and a vehicle heading at the end point of the turn section, that is, a target vehicle heading deflection (or displacement).

The processor 150 may estimate a maximum curvature and a maximum steering angular speed based on the end point of the turn section and the target vehicle heading deflection. The processor 150 may estimate the maximum curvature and the maximum steering angular speed using a DNN. In other words, the processor 150 may input the end point of the turn section and the target vehicle heading deflection to the DNN and may output the maximum curvature and the maximum steering angular speed determined based on the end point of the turn section and the target vehicle heading deflection in the DNN.

In S220, the processor 150 may be configured to determine a first clothoid curve based on the start point of the turn section, the maximum curvature, and the maximum steering angular speed. The first clothoid curve may use the start point of the turn section as its start point. The processor 150 may be configured to determine an end point of the first clothoid curve and a vehicle heading and a curvature at the end point using Equations 3 to 5 above. Furthermore, the processor 150 may be configured to determine the first clothoid curve while increasing the curvature from "0" to a maximum curvature $k_{max}$.

In S230, the processor 150 may be configured to determine a circle curve in which the end point of the first clothoid curve is a start point, based on a heading of the vehicle, which may change using the end point of the first clothoid curve, the maximum curvature, and the clothoid section. The processor 150 may be configured to determine a rotational center point using the end point of the first clothoid curve (i.e., the start point of the circle curve) and the maximum curvature depending on Equation 6 above. The processor 150 may be configured to determine a circle curve using the end point of the first clothoid curve, the target vehicle heading deflection, the vehicle heading deflection in the clothoid section, and the rotational center point.

In S240, the processor 150 may be configured to determine a second clothoid section based on the rotational center point, the target vehicle heading deflection, and the vehicle heading deflection in the clothoid section. The second clothoid curve may be a path configured from the end point of the circle curve to the target point in the turn section. The processor 150 may be configured to determine an end point of the second clothoid curve, that is, a target point of the turn section, and a vehicle heading and a curvature at the end point using Equation 9 below.

In S250, the processor 150 may be configured to generate a turn path including the first clothoid curve, the circle curve, and the second clothoid curve. The processor 150 may connect the end point of the first clothoid curve with the start point of the circle curve and may connect the end point of the circle curve with the start point of the second clothoid curve to generate a continuous curvature path.

Figure 10:
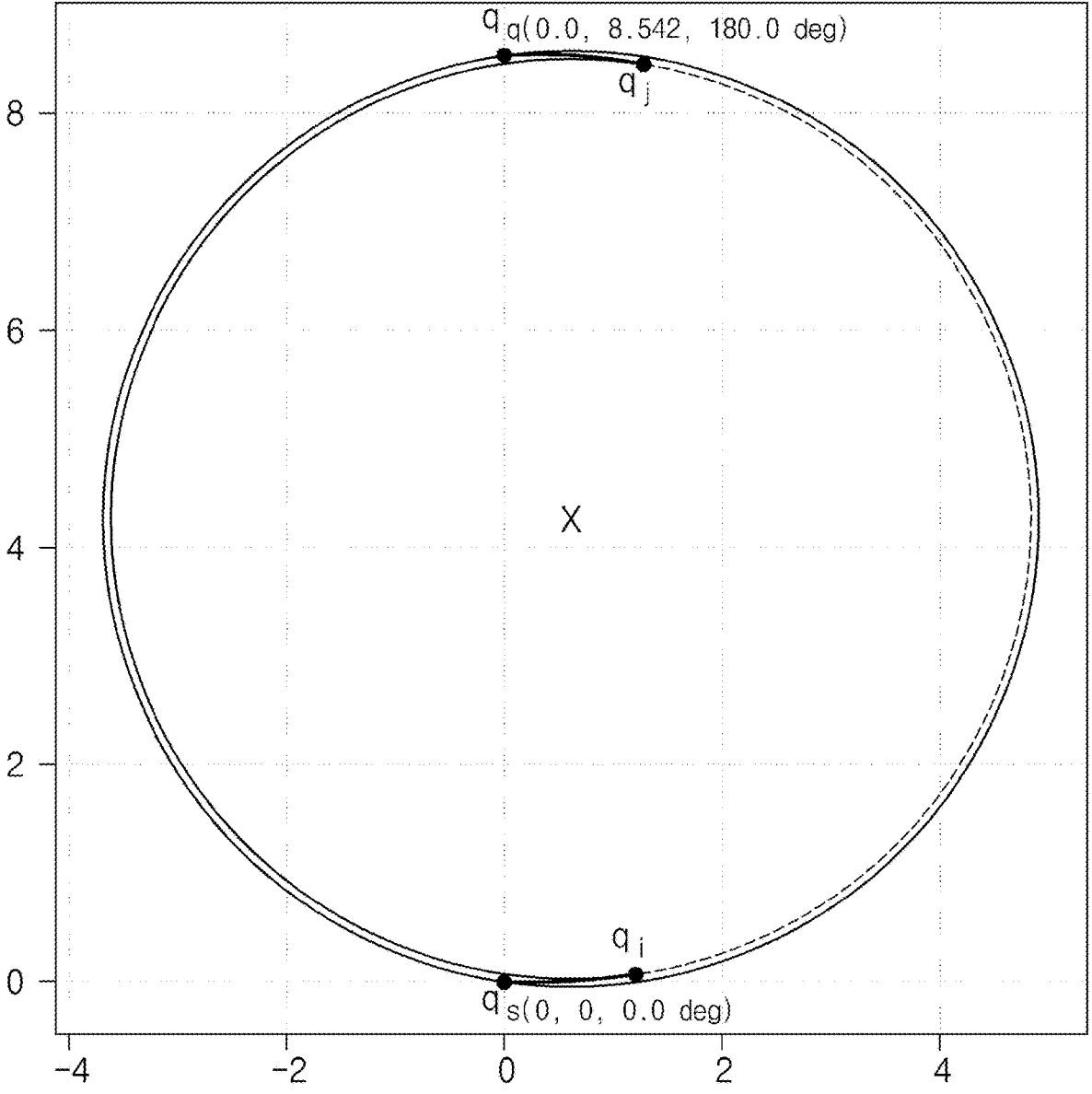
FIG. 10 illustrates an example of generating a turn path according to various exemplary embodiments of the present disclosure.

FIG. 10 illustrates an example of generating a turn path according to various exemplary embodiments of the present disclosure.

Referring to FIG. 10, it may be seen that there is a need for 8.5 [m] in a U-turn distance. Because the U-turn distance decreases by 1.5 [m] compared to an existing technology, it is possible to make a U-turn on a third lane. An autonomous driving control apparatus 100 may enable a vehicle to make a U-turn at a shorter distance than that in the existing technology.

The autonomous driving control apparatus 100 may be configured to generate a turn path with a continuous curvature, thus preventing the vehicle from being unnecessarily stopped. Furthermore, the autonomous driving control apparatus 100 may be configured to generate a path in which a non-holonomic constraint of a real vehicle is inflected, thus satisfying vehicle kinematics and facilitating smooth driving.

Embodiments of the present disclosure may configure a continuous curvature path using two clothoid curves and one circle curve and may provide the continuous curvature path so that the vehicle does not stop in a narrow turn section, such as a U-turn section, and smoothly turns along the continuous curvature path.

Furthermore, the term related to a control device such as "controller", "control apparatus", "control unit", "control device", "control module", or "server", etc refers to a hardware device including a memory and a processor configured to execute one or more steps interpreted as an algorithm structure. The memory stores algorithm steps, and the processor executes the algorithm steps to perform one or more processes of a method in accordance with various exemplary embodiments of the present disclosure. The control device according to exemplary embodiments of the present disclosure may be implemented through a nonvolatile memory configured to store algorithms for controlling operation of various components of a vehicle or data about software commands for executing the algorithms, and a processor configured to perform operation to be described above using the data stored in the memory. The memory and the processor may be individual chips. Alternatively, the memory and the processor may be integrated in a single chip. The processor may be implemented as one or more processors. The processor may include various logic circuits and operation circuits, may be configured for processing data according to a program provided from the memory, and may be configured to generate a control signal according to the processing result.

The control device may be at least one microprocessor operated by a predetermined program which may include a series of commands for carrying out the method included in the aforementioned various exemplary embodiments of the present disclosure.

The aforementioned invention can also be embodied as computer readable codes on a computer readable recording medium. The computer readable recording medium is any data storage device that can store data which may be thereafter read by a computer system and store and execute program instructions which may be thereafter read by a computer system. Examples of the computer readable recording medium include Hard Disk Drive (HDD), solid state disk (SSD), silicon disk drive (SDD), read-only memory (ROM), random-access memory (RAM), CD-ROMs, magnetic tapes, floppy discs, optical data storage devices, etc and implementation as carrier waves (e.g., transmission over the Internet). Examples of the program instruction include machine language code such as those generated by a compiler, as well as high-level language code which may be executed by a computer using an interpreter or the like.

In various exemplary embodiments of the present disclosure, each operation described above may be performed by a control device, and the control device may be configured by a plurality of control devices, or an integrated single control device.

In various exemplary embodiments of the present disclosure, the memory and the processor may be provided as one chip, or provided as separate chips.

In various exemplary embodiments of the present disclosure, the scope of the present disclosure includes software or machine-executable commands (e.g., an operating system, an application, firmware, a program, etc.) for enabling operations according to the methods of various embodiments to be executed on an apparatus or a computer, a non-transitory computer-readable medium including such software or commands stored thereon and executable on the apparatus or the computer.

In various exemplary embodiments of the present disclosure, the control device may be implemented in a form of hardware or software, or may be implemented in a combination of hardware and software.

Furthermore, the terms such as "unit", "module", etc. included in the specification mean units for processing at least one function or operation, which may be implemented by hardware, software, or a combination thereof.

In an exemplary embodiment of the present disclosure, the vehicle may be referred to as being based on a concept including various means of transportation. In some cases, the vehicle may be interpreted as being based on a concept including not only various means of land transportation, such as cars, motorcycles, trucks, and buses, that drive on roads but also various means of transportation such as airplanes, drones, ships, etc.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The term "and/or" may include a combination of a plurality of related listed items or any of a plurality of related listed items. For example, "A and/or B" includes all three cases such as "A", "B", and "A and B".

In the present specification, unless stated otherwise, a singular expression includes a plural expression unless the context clearly indicates otherwise.

In exemplary embodiments of the present disclosure, "at least one of A and B" may refer to "at least one of A or B" or "at least one of combinations of at least one of A and B". Furthermore, "one or more of A and B" may refer to "one or more of A or B" or "one or more of combinations of one or more of A and B".

In the exemplary embodiment of the present disclosure, it should be understood that a term such as "include" or "have" is directed to designate that the features, numbers, steps, operations, elements, parts, or combinations thereof described in the specification are present, and does not preclude the possibility of addition or presence of one or more other features, numbers, steps, operations, elements, parts, or combinations thereof.

According to an exemplary embodiment of the present disclosure, components may be combined with each other to be implemented as one, or some components may be omitted.

The foregoing descriptions of specific exemplary embodiments of the present disclosure have been presented for purposes of illustration and description. They are not intended to be exhaustive or to limit the present disclosure to the precise forms disclosed, and obviously many modifications and variations are possible in light of the above teachings. The exemplary embodiments were chosen and described in order to explain certain principles of the invention and their practical application, to enable others skilled in the art to make and utilize various exemplary embodiments of the present disclosure, as well as various alternatives and modifications thereof. It is intended that the scope of the present disclosure be defined by the Claims appended hereto and their equivalents.

What is claimed is:

1. An autonomous driving control apparatus, comprising:
a processor configured to receive a driving path from a navigation device operatively connected to the processor,
wherein the processor is configured to:
identify a turn section included in the driving path;
obtain, based on information related to the turn section and an identification of the turn section, a start point of the turn section, an end point of the turn section and a target vehicle heading deflection;
generate, based on the end point of the turn section and the target vehicle heading deflection, a turn path, wherein a curvature of the turn path is continuously changed;
output the turn path; and
control a vehicle to drive along the turn path,
wherein the driving path includes the information related to the turn section.

2. The autonomous driving control apparatus of claim 1, wherein the processor is further configured for estimating a maximum curvature and a maximum steering angular speed based on the end point of the turn section and the target vehicle heading deflection, and
wherein the turn path is generated based on the maximum curvature and the maximum steering angular speed.

3. The autonomous driving control apparatus of claim 2, wherein the processor is further configured for estimating the maximum curvature and the maximum steering angular speed using a deep neural network (DNN).

4. The autonomous driving control apparatus of claim 2, wherein the processor is further configured to determine an end point of a first clothoid curve and a vehicle heading and a curvature at the end point of the first clothoid curve based on the maximum curvature and the maximum steering angular speed.

5. The autonomous driving control apparatus of claim 4, wherein the processor is further configured to determine a clothoid length based on the maximum curvature and the maximum steering angular speed.

6. The autonomous driving control apparatus of claim 5, wherein the processor is further configured to determine a vehicle heading deflection in a clothoid section based on the maximum curvature and the maximum steering angular speed.

7. The autonomous driving control apparatus of claim 6, wherein the processor is further configured to:
determine a rotational center point based on the end point of the first clothoid curve, the vehicle heading at the end point of the first clothoid curve, and the maximum curvature; and
determine a circle curve based on the end point of the first clothoid curve, the target vehicle heading deflection, the vehicle heading deflection in the clothoid section, and the rotational center point.

8. The autonomous driving control apparatus of claim 7, wherein the processor is further configured to determine a second clothoid curve based on the target vehicle heading deflection and the rotational center point.

9. The autonomous driving control apparatus of claim 8, wherein the processor is further configured to determine the turn path using the first clothoid curve, the circle curve, and the second clothoid curve.

10. A method for generating a driving path of an autonomous driving control apparatus, the method comprising:
receiving, by a processor, a driving path from a navigation device;
identifying, by the processor, a turn section included in the driving path;
obtaining, based on information related to the turn section and an identification of the turn section, a start point of the turn section, an end point of the turn section and a target vehicle heading deflection;
generating, by the processor, based on the end point of the turn section and the target vehicle heading deflection, a turn path, wherein a curvature of the turn path is continuously changed;
outputting, by the processor, the turn path; and
controlling, by the processor, a vehicle to drive along the turn path,
wherein the driving path includes the information related to the turn section.

11. The method of claim 10, wherein the determining of the turn path further includes:
estimating a maximum curvature and a maximum steering angular speed based on the end point of the turn section and the target vehicle heading deflection, and
wherein the turn path is generated based on the maximum curvature and the maximum steering angular speed.

12. The method of claim 11, wherein the estimating of the maximum curvature and the maximum steering angular speed includes:
estimating the maximum curvature and the maximum steering angular speed using a deep neural network (DNN).

13. The method of claim 11, wherein the determining of the turn path further includes:
determining an end point of a first clothoid curve and a vehicle heading and a curvature at the end point of the first clothoid curve based on the maximum curvature and the maximum steering angular speed.

14. The method of claim 13, wherein the determining of the turn path further includes:
determining a clothoid length based on the maximum curvature and the maximum steering angular speed.

15. The method of claim 14, wherein the determining of the turn path further includes:
determining a vehicle heading deflection in a clothoid section based on the maximum curvature and the maximum steering angular speed.

16. The method of claim 15, wherein the determining of the turn path further includes:
determining a rotational center point based on the end point of the first clothoid curve, the vehicle heading at the end point of the first clothoid curve, and the maximum curvature; and
determining a circle curve based on the end point of the first clothoid curve, the target vehicle heading deflection, the vehicle heading deflection in the clothoid section, and the rotational center point.

17. The method of claim 16, wherein the determining of the turn path further includes:

determining a second clothoid curve based on the target vehicle heading deflection and the rotational center point.

18. The method of claim 17, wherein the determining of the turn path further includes:

determining the turn path using the first clothoid curve, the circle curve, and the second clothoid curve.

\* \* \* \* \*